United States Patent Office 3,666,507
Patented May 30, 1972

3,666,507
FUSION-CAST CARBIDE CERAMIC
COMPRISING FREE-SILICON
Allen M. Alper, Towanda, Pa., and Robert C. Doman, Painted Post, and Neil E. Johnson and Robert N. McNally, Corning, N.Y., assignors to Corning Glass Works, Corning, N.Y.
No Drawing. Filed May 15, 1970, Ser. No. 37,861
Int. Cl. B22f 3/00; C04b 35/14
U.S. Cl. 106—44                  5 Claims

ABSTRACT OF THE DISCLOSURE

Dense, fine-grained, essentially crack-free toughly coherent bodies having a crystalline microstructure consisting essentially of, by weight, 10 to 89% boron carbide phase, 10 to 89% silicon carbide phase and 1 to 30% silicon phase, which latter phase is important to noted essential characteristics. Method of fusion casting employing batch mixture including elemental silicon in an effective amount at least sufficient to yield the silicon phase. Useful in a variety of situations requiring good resistance to degradation at high temperature, chemical corrosion, abrasive wear and/or impact stresses.

BACKGROUND OF THE INVENTION

Field of the invention

The invention relates to fusion cast ceramic predominantly composed of carbides of boron and silicon, and to a method of producing dense, fine grained, essentially crack free bodies of such ceramic in a variety of shapes and sizes.

Description of the prior art

The early work of Boyer and Rose (U.S. Pats. 2,108,794 and 2,109,246) demonstrated that crude fused masses composed essentially of the mixed discrete crystalline microstructural phases of boron carbide and silicon carbide, which form, at least in part, a eutectic structure, could be formed from an appropriate raw material mixture around a carbon resistor in an electrical resistance heating furnace or packed in powdered coke in an electrical induction heating furnace. These masses were readily broken or crushed into desirable abrasive gain. Shaped or molded dense bodies were formed by hot pressing the powdered prefused and/or raw material mixtures at temperatures of partial or complete fusion in a suitable electrical resistance heating furnace wherein the shaped or molded mixtures were cooled to complete solidification and to handling temperature. Obviously, that cooling of the mixtures in the heating furnace is not especially rapid due to the retained heat content therein. Nevertheless, it was noted that such shaped or molded bodies had a tendency to crack during the forming or cooling operations, which could be minimized by small additions of refractory metal carbide, such as tungsten carbide.

Another method of forming shaped or molded bodies of fused ceramic, which method is more readily adaptable to producing a variety of shapes and sizes, is fusion casting as generally described in U.S. Pat. 1,615,750 and in Norton's "Refractories," 4th ed. (1968) 186–89. While that process is more commonly associated with fused oxide compositions, it is also readily adaptable to producing fine-grained fusion-cast bodies of carbide compositions (e.g. see U.S. Pat. 3,340,078) by virtue of the relatively rapid solidification thereof occurring in the initailly unheated mold.

Accordingly, there arose in use an interest in applying fusion casting to the boron-silicon carbides compositions as discolsed by Boyer and Rose in order to produce a variety of dense, toughly coherent bodies that are resistant to degradation at high temperatures (at least up to about 1400° C.), chemical corrosion, abrasive wear and/or impact stresses (e.g. electrical resistance heating elements, heat exchanger elements, hot gas exhaust linings or nozzls, crucibles—boats—spouts for molten metals, kiln furniture and special furnace refractories, reheat furnace skid rails, high temperature bearings and dies, armor plate, abrasive machining tools and bodies, sand or grit blast nozzles, coke chute linings, vessels or piping for abrasive and/or corrosive fluid materials, etc.). Unfortunately, our efforts in this regard were not successful because of prevalent severe cracking and not infrequent porosity or voids in the resulting fusion-cast bodies. Needless to say, these bodies did not have the needed tough coherency and, in many cases, density. It appears that those fused compositions of only mixed boron and silicon carbides are not capable of withstanding, without serious cracking, the stresses resulting during the relatively rapid solidification necessary for developing a fine-grained structure, which, in the absence of cracking, would contribute to good strength and toughness in the fusion-cast bodies. The porosity problem may be related, at least in part, to one or more of such effects as difficulty in attaining sufficient superheating of the melt for casting, of a temperature range of solidification that is too limited, of gases developed in the melt and of the volume shrinkage that occurs during solidification, which effects can operate to cause numerous voids or pores in fusion-cast bodies. Whatever the actual reasons, a large majority of these fusion-cast bodies, which were essentially composed of mixed discrete boron carbide and silicon carbide phases, were found to exhibit severe cracking, and a great number of them were afflilcted with determiental voids or porosity.

While boron carbide is commonly designated as $B_4C$, it is now known that boron carbide, with its characteristic rhombohedral structure, exists with the proportions of boron and carbon therein varying over a range including the common precise 4:1 formula. For example, see Glaser et al., J. Appl. Phys., 24 (6), 731–33 (1953), and Dolloff, USAF WADD TR 60–143 (ASTIA Cat. No. 244270), 11–14 (July 1960) and other references cited therein. Accordingly, as used herein, the term "boron carbide" means and includes that rhombohedral structure formed of boron and carbon in any and all possible proportions.

SUMMARY OF THE INVENTION

We have now discovered a novel, dense, fine-grained, fusion-cast ceramic and a method of making it, which is predominantly composed of the mixed discrete phases of boron and silicon carbides, and that is essentially crack-free and toughly coherent as indicated by room temperature modulus of rupture in flexure (MOR) of in excess of about 9000 p.s.i. and by room temperature Young's modulus of elasticity (MOE) of in excess of about $40 \times 10^6$ p.s.i. This ceramic or composite is also characterized by density of in excess of about 90% of theoretical and by very great hardness for wear resistance.

Throughout this specification, all percentages and portions of phases and constituents are on a weight basis unless noted otherwise elsewhere herein.

In its broadest scope, the novel fusion-cast ceramic has a crystalline microstructure consisting essentially of 10 to 89% boron carbide phase, 10 to 89% silicon carbide phase, and 1–30% silicon phase. However, in its more desired form, the boron carbide phase is 16 to 70%, the silicon carbide phase is 26 to 80% and the silicon phase is 4 to 12%. In fusion casting ceramic with more than 70% boron carbide phase, the lower viscosity melt has a capability of more rapid dissolution of the carbon melting pot, and this makes it difficult (although not impossible) to control the formation of the melt without dissolving a detrimental amount of the carbon pot, which yields, upon subsequent solidification, undesirable free graphite phase in the ceramic that degrades the noted properties of concern here. Also, fusion casting ceramic with more than 80% silicon carbide phase requires higher melting temperatures that tend to cause undesirable loss of material by volatilization.

The boron carbide phase generally is a matrix phase in which the silicon carbide phase and the silicon phase are dispersed. At least part of the silicon cabide phase is in the form of extremely fine particles forming a eutectic structure with contiguous portions of the matrix phase. The silicon phase is ordinarily substantially contiguous with portions of the silicon carbide phase. Upon examination of extended areas of the microstructure, portions of the silicon phase are randomly found in the form of elongated masses that apparently fill and seal (or close up) former microcracks developed in the microstructure during cooling thereof following its formation by solidification. Thus, the presence of the silicon phase, as the one with the lowest melting point (about 1414° C.), not only inhibits cracking to a minimal amount and type, but, while still liquid, also appears to fill or "heal" structural void defects such as cracks and pores apparently developed during solidification and cooling to some temperature above the melting point of silicon. Another beneficial effect of excess or free silicon sufficient to form the silicon phase is that it inhibits the formation of free carbon (graphite) blades or platelets that can detrimentally affect MOE and composite hardness.

Additionally, our discovery disclosed herein can be viewed as including an improved method of manufacturing dense, fine-grained, fusion-cast ceramic microstructurally consisting essentially of 10 to 89% boron carbide phase and 10 to 89% silicon carbide phase whereby the resulting ceramic is essentially crack-free and toughly coherent as noted above. Such method involves the usual preparation of a batch mixture of proportioned boron-carbon-silicon-yielding raw material that forms, upon fusion casting, the phases noted above and fusion casting that batch mixture to form the ceramic. In this method, the improvement comprises including elemental silicon in the batch mixture in an effective amount sufficient to yield a silicon phase in the ceramic amounting to 1 to 30% thereof. Of course, the previously noted more desired range limits of the three essential phases are also applicable to our discovery in terms of a method. The improvement in the method appears to make it easier to adequately superheat enough melt for casting and to provide a more extended temperature range of solidification so that gas pockets or pores are not as readily formed in the fusion-cast bodies. An added advantage to our discovered method is that it makes possible a reasonable use of boric oxide as one or the only batch mixture constituent yielding boron to combine with carbon. We have found it extremely difficult to concurrently react and melt mixtures of the oxides of boron and silicon in combination with carbon. The resulting fused product usually still contains undesirable quantities of oxide and free carbon in addition to the desired carbides. By employing elemental silicon mixed with elemental carbon and boric oxide (with or without portions of boron carbide and silicon carbide), no such difficulties were encountered to any significant degree.

When it is desired to produce fused-cast ceramic of this invention with the best refractoriness and resistance to degradation at high temperature, it is advantageous to provide that ceramic with a phase weight ratio of silicon carbide to boron carbide equal to at least 3:2. In addition to the very fine eutectic silicon carbide phase dispersed in the boron carbide matrix phase, the microstructure of such ceramic also contains a substantial amount of interlocking blades or platelets of silicon carbide dispersed therethrough.

However, the structure described immediately above is not advantageous for the best resistance to wear and impact, i.e. toughness. For the latter purpose, the ceramic of this invention should be provided with a phase weight ratio of boron carbide to silicon carbide ranging from 7:1 to 3:2. Such ratio assures the occurrence of substantially all the silicon carbide phase as a eutectic structure with the boron carbide matrix phase. It also provides the ceramic with a lightweight characteristic that may be especially desirable for certain uses.

Suitable boron-carbon-silicon-yielding raw material for the practice of this invention are preferably selected from commercially available (preferably high purity grades of) boron metal, carbon black, silicon metal, boron carbide, silicon carbide and silicon borides. Although boric oxide is not quite as easy to work with as the aforementioned materials due to the occurrence of the reduction reaction concurrently with melting, it can also be employed as previously noted. Silica, as we have found, is not a particularly desirable raw material because of difficulties encountered with its concurrent reduction and melting.

As is more common in fusion casting, we prefer to employ an electric arc melting furnace with graphite electrodes. However, if desired, other types of melting furnaces can also be used, such as electron beam, electrical induction and plasma arc. For arc melting, the furnace can be of either type: electrodes suspended from above and projecting down into the melting chamber or one such suspended electrode and another electrode extending from beneath the furnace up through the base of the melting chamber or pot to contact the melting material pool. For the melting chamber, we find it advantageous to employ the construction described below.

In that construction, a conventional water-cooled metal (steel) furnace pot is employed. A melting pot liner formed of a solid carbon body is positioned within the pot and spaced apart therefrom. The space between the pot and the carbon liner is filled with graphite felt and/or powdered carbon to reduce heat loss and thereby provide a capability of developing a sufficient volume of melt for casting. The carbon liner should be of bonded or baked amorphous carbon in the case of the furnace type having an electrode centrally extending up through the bottom of the pot and liner. In the other type of furnace with all electrodes suspended from above, the carbon liner can be either of graphite or amorphous carbon. The thickness of the carbon liner and the insulation layer of graphite felt or powdered carbon are proportioned generally in relation to the melting temperature and to the volume of liquid generated in the pot. For a liquid volume of about 2500 cubic inches at a temperature of about 2200–2400° C., generated at about 150 volts-4000 amperes, contained in a liner comprising an annular carbon brick wall 4.5 inches thick with an inside diameter of two feet and a graphite slab bottom 7 inches thick, and with cooling water temperature maintained at about 10° C., it has been found very suitable to employ a one inch thick carbon black insulating layer between the pot and liner. A conventional crown or cover loosely fitting around the electrode or electrodes is positioned substantially over the top opening of the furnace chamber to inhibit the oxidizing effect of ambient air on the melt. The furnace is also desirably tiltable and equipped with a spout for pouring the melt into molds.

Suitable molds are preferably made of graphite slabs assembled together to form the sides, bottoms and tops (or fonts) thereof. However, the molds can be made of other highly refractory materials suitable for this purpose or of water-cooled metal, such as steel, cast iron or copper. In forming fusion-cast slabs or sheets, one can employ an inclined water-cooled metal plate as the mold onto the upper end of which the melt is poured, allowed to spread, flow down and solidify thereon. Hollow shapes, including those from which it may be desired to cut either flat or curved relatively thin bodies, can be formed by the drain or dip casting techniques. In drain casting, part of the melt in the mold is allowed to solidify along the mold walls to a desired thickness and then the remaining melt is poured or drained out of the mold. In dip casting, the mold is a body of desired shape that is immersed in the melt to allow part of it to solidify to a desired thickness on the external surfaces of the mold body whereon the mold with the solidified melt shell are removed from the remaining melt. Also when desired, vacuum casting can be employed, e.g. sucking the melt into a mold in which at least a partial vacuum has been created. Combinations of the foregoing casting techniques can also be advantageously employed.

Immediately after a fusion-cast body has at least substantially solidified to a self-sustaining shape in the desired form, it is annealed (i.e. slow cooled to substantially room temperature) according to conventional fusion-casting procedures. As is known, such annealing can be done by either surrounding the mold prior to casting with a layer of suitable annealing powder (all of which is contained within an outer can or casing) and covering the top of the mold immediately after casting with annealing powder or by quickly removing the hot fusion-cast body from the mold and burying it in annealing powder. We prefer to use powdered carbon or coke as the annealing powder in carrying out this invention; however, other suitable annealing powders, e.g. silicon carbide, can be employed when desired. Another known alternative annealing procedure that can be used when desired is quickly removing the hot fusion-cast body from the mold, placing it in an annealing kiln preheated to substantially the same temperature as the body and then gradually lowering the kiln temperature.

DESCRIPTION OF THE PREFERRED

Example 1

The following finely divided raw materials were employed in producing five fusion-cast ceramics designated below as Body Nos. 1-5:

Boron metal—90.3% B, 0.3% water soluble B, 5.5% Mg, 0.3% matter insoluble in $H_2O_2$, 0.14% moisture and volatiles;
Carbon black—99+% C;
Silicon metal—98.25% min. Si, 0.50% max. Fe, 0.07% max. Ca.

These materials were premixed in the proportions of 27.18% boron metal, 25.15% carbon black and 47.64% silicon metal, which corresponds to 34.73% $B_4C$, 58.74% SiC and 6.53% Si. Five of these batch mixtures were melted in an electric arc furnace with one electrode above and one below the melt as previously described. The melts were cast into graphite molds with a cavity base of either 4 x 4 inches or 6 x 6 inches to form fusion cast bodies of about 1–6 inches in height. As soon as it was apparent that the bodies had solidified in the molds to the point of having a self-sustaining shape, they were quickly removed from the molds and placed in an annealing environment of either being buried in carbon black or an appropriately preheated kiln. After cooling substantially to room temperature in the annealing environment, all these bodies were visually found to be crack-free, except for a few, very fine or hairline, tight cracks in Body No. 4, and uniformly very dense (excluding the usual central shrinkage pipe or void in the upper portions thereof). Samples were cut from these bodies for examination and testing, the results of which are set forth in Table 1.

TABLE 1

| | Body Number | | | | |
|---|---|---|---|---|---|
| | 1 | 2 | 3 | 4 | 5 |
| | Point count phase analysis, percent | | | | |
| Boron carbide | 34.9 | 35.6 | 38.2 | 36.0 | [1] 36.2 |
| Silicon carbide | 57.5 | 59.7 | 50.5 | 48.8 | [1] 54.1 |
| Silicon | 7.6 | 4.7 | 11.3 | 15.2 | [1] 9.7 |
| MOE ×10⁶, p.s.i. | [2] 53.55 | [2] 58.02 | 42.8 | 51.56 | 46.54 |
| MOR ×10³, p.s.i. | | | | 9.36 | |
| Density, gm./cm.³ | | 2.90 | 2.71 | 2.81 | 2.68 |
| Porosity, volume percent | | | | | 10 |

[1] Approximate values based on average of other bodies.
[2] Average of two test values.

Example 2

Using the same raw materials and procedure as in Example 1, a satisfactory fusion-cast ceramic was made from a batch mixture of 28.53% boron metal, 26.68% carbon black and 44.79% silicon metal, which corresponds to 36.58% $B_4C$, 61.83% SiC and 1.59% Si. These latter values were substantially (±5% thereof) the same as a point count analysis of a sample of this ceramic body. From two tests on samples of the body, the average MOE was found to be $51.47 \times 10^6$ p.s.i. Density was determined to be 2.83 gm./cm.³.

Example 3

Employing the raw materials and the procedure as in Example 1, a satisfactory dense fusion-cast body was made from a batch mixture of 73.40% boron metal, 18.62% carbon black and 7.98% silicon metal. Upon point count analysis, the phases were found to be 78.4% boron carbide, 11.8% silicon carbide and 9.8% silicon. From two tests on samples of this body, the average MOE was found to be $50.64 \times 10^6$ p.s.i.

Example 4

By employing the procedure as in Example 1 a suitably dense crack-free body is obtained from a batch mixture of 41.8% boric oxide (98.9% purity), 34.7% carbon black and 23.5% silicon metal. The latter two raw materials are described in Example 1. The resultant fusion-cast body is characterized by a point count phase analysis substantially the same (±5% deviation) as that of Body No. 5 in Table 1.

Example 5

Several dense, crack-free, fusion-cast bodies were prepared from batch mixtures consisting of 58.74% silicon carbide (98.7% purity), 34.73% boron carbide (99.7% purity) and 6.53% silicon metal (as described in Example 1). Substantially the same procedure as in Example 1 was employed with a few bodies being formed via the additional technique of vacuum casting by sucking the melt into a partially evacuated mold. A typical point count phase analysis of these bodies is as follows: 56.8% silicon carbide phase, 36.5% boron carbide phase and 6.7% silicon phase. Typical physical property characteristics of such bodies are: $58.8 \times 10^6$ p.s.i. average MOE, 2.83 gm./cm.³ bulk density and 0.405% apparent porosity.

We claim:
1. A dense, fine-grained, fusion-cast ceramic having a crystalline microstructure consisting essentially of, on a weight basis, 10 to 89% boron carbide phase, 10 to 89% silicon carbide phase and 1 to 30% free silicon phase, wherein said boron carbide phase is a matrix phase, said silicon carbide phase is dispersed within said matrix phase, at least part of said silicon carbide phase forming a eutectic structure with contiguous portions of said matrix phase, and said silicon phase dispersed within said matrix phase is substantially contiguous with portions of said silicon carbide phase.

2. The ceramic of claim 1 wherein, on a weight basis, the boron carbide phase is 16 to 70%, the silicon carbide phase is 26 to 80% and the silicon phase is 4 to 12%.

3. The ceramic of claim 2 wherein the phase weight ratio of silicon carbide to boron carbide is at least 3:2.

4. The ceramic of claim 2 wherein the phase weight ratio of boron carbide to silicon carbide ranges from 7:1 to 3:2.

5. The ceramic of claim 1 wherein portions of said silicon phase are in the form of elongated masses filling former cracks developed in said microstructure during cooling thereof following its formation by solidification.

References Cited
UNITED STATES PATENTS

| | | | |
|---|---|---|---|
| 2,108,794 | 2/1938 | Boyer et al. | 106—44 |
| 3,340,078 | 9/1967 | Alper et al. | 106—43 X |
| 3,443,935 | 5/1969 | Lipp | 106—43 X |
| 2,814,566 | 11/1957 | Glaser | 106—43 |
| 2,684,297 | 7/1954 | Urban | 75—96 X |

DANIEL E. WYMAN, Primary Examiner

W. R. SATTERFIELD, Assistant Examiner

U.S. Cl. X.R.

29—182.7; 75—203; 106—43; 264—29